US012469965B2

(12) United States Patent
Lee et al.

(10) Patent No.: US 12,469,965 B2
(45) Date of Patent: Nov. 11, 2025

(54) HYBRID SCANNING ANTENNA

(71) Applicants: Lin-Nan Lee, Potomac, MD (US); Peter Hou, North Potomac, MD (US); Victor Liau, Germantown, MD (US)

(72) Inventors: Lin-Nan Lee, Potomac, MD (US); Peter Hou, North Potomac, MD (US); Victor Liau, Germantown, MD (US)

(73) Assignee: Hughes Network Systems, Germantown, MD (US)

( * ) Notice: Subject to any disclaimer, the term of this patent is extended or adjusted under 35 U.S.C. 154(b) by 1013 days.

(21) Appl. No.: 17/457,522

(22) Filed: Dec. 3, 2021

(65) Prior Publication Data

US 2022/0328975 A1 Oct. 13, 2022

Related U.S. Application Data

(60) Provisional application No. 63/171,940, filed on Apr. 7, 2021.

(51) Int. Cl.
*H01Q 3/26* (2006.01)
*H01Q 1/12* (2006.01)
(Continued)

(52) U.S. Cl.
CPC ............. *H01Q 3/2658* (2013.01); *H01Q 1/34* (2013.01); *H01Q 3/08* (2013.01); *H01Q 3/20* (2013.01); *H01Q 3/36* (2013.01); *H01Q 15/16* (2013.01); *H01Q 19/15* (2013.01); *H01Q 19/175* (2013.01); *H01Q 1/125* (2013.01); *H01Q 1/185* (2013.01)

(58) Field of Classification Search
CPC ....... H01Q 3/02–08; H01Q 1/125–164; H01Q 19/10–195; H01Q 15/16–168; H01Q 3/26–42
See application file for complete search history.

(56) References Cited

U.S. PATENT DOCUMENTS 4,284,992 A * 8/1981 Gans ........................ H01Q 5/45 333/248
4,544,925 A * 10/1985 Drabowitch ........... H01Q 25/00 342/16

(Continued)

FOREIGN PATENT DOCUMENTS

GB 1221922 A 2/1971
GB 2199447 A * 7/1988 ........... H01Q 3/2658
WO 2002031915 A3 10/2003

OTHER PUBLICATIONS

International Search Report for PCT Application No. PCT/US2022/071473.

*Primary Examiner* — Ab Salam Alkassim, Jr.
(74) *Attorney, Agent, or Firm* — Capitol City TechLaw; Jasbir Singh

(57) ABSTRACT

A hybrid scanning antenna including: a reflector having a focal line; a first mechanical movement to move the reflector about a first axis; a second mechanical movement to move the reflector about a second axis; a linear array fixedly disposed along the focal line to electronically scan at a scan angle about a third axis; and a controller to control the first mechanical movement, the second mechanical movement and the scan angle of the linear array to orient the hybrid scanning antenna to a look angle of a remote transceiver.

18 Claims, 2 Drawing Sheets

(51) Int. Cl.

| | |
|---|---|
| ***H01Q 1/18*** | (2006.01) |
| ***H01Q 1/34*** | (2006.01) |
| ***H01Q 3/08*** | (2006.01) |
| ***H01Q 3/20*** | (2006.01) |
| ***H01Q 3/36*** | (2006.01) |
| ***H01Q 15/16*** | (2006.01) |
| ***H01Q 19/15*** | (2006.01) |
| ***H01Q 19/17*** | (2006.01) |

(56) References Cited

U.S. PATENT DOCUMENTS 5,061,936 A * 10/1991 Suzuki .................... H01Q 3/10 342/359
5,841,397 A * 11/1998 Hopkins ................ H01Q 3/245 342/75
5,949,370 A * 9/1999 Smith ...................... H01Q 3/16 342/359
6,160,520 A * 12/2000 Muhlhauser ......... H01Q 19/175 343/755
6,211,836 B1 * 4/2001 Manasson ............ H01Q 19/175 343/781 R
7,095,376 B1 * 8/2006 Timothy ................ H01Q 1/125 343/705
10,158,170 B2 * 12/2018 Elad ..................... H01Q 3/2664
10,177,434 B1 * 1/2019 Sriram ................. H01Q 25/007
11,196,173 B1 * 12/2021 Rmili ..................... H01Q 5/307
2004/0108963 A1 * 6/2004 Clymer .............. H01Q 21/0037 343/837
2005/0140558 A1 * 6/2005 Jung ...................... H01Q 19/17 343/781 R
2005/0140563 A1 * 6/2005 Eom .................... H01Q 3/2658 343/840
2007/0001920 A1 * 1/2007 Webb ..................... H01Q 3/005 343/702
2010/0238082 A1 * 9/2010 Kits van Heyningen .................. H01Q 15/0013 343/779
2011/0063179 A1 * 3/2011 Guler ....................... H01Q 3/20 343/781 R
2012/0212371 A1 * 8/2012 Chang .................. H01Q 3/2605 342/368
2013/0321204 A1 * 12/2013 Zahavi ..................... H01Q 3/26 342/368
2016/0226136 A1 * 8/2016 Paleta, Jr. .............. H01Q 19/13
2017/0214145 A1 * 7/2017 Elad ..................... H01Q 19/175
2017/0264020 A1 * 9/2017 Jackson ................. H01Q 19/19
2018/0175477 A1 * 6/2018 Gothelf .................... H01Q 1/28
2019/0280373 A1 * 9/2019 Adada ...................... H01Q 1/34
2019/0280391 A1 * 9/2019 Sanjuan Flores ........ H01Q 1/38
2022/0128708 A1 * 4/2022 Lee .................... H04B 7/18517
2023/0246345 A1 * 8/2023 Turpin ..................... H01Q 1/02 343/702
2024/0291144 A1 * 8/2024 Vigano .................. H01Q 3/245

* cited by examiner

HYBRID SCANNING ANTENNA

CROSS-REFERENCE TO RELATED APPLICATIONS AND INCORPORATION BY REFERENCE

The present application claims the benefit under 35 U.S.C. 119(e) of U.S. Provisional Application Ser. No. 62/171,940, filed Apr. 7, 2021, which is incorporated herein by reference in its entirety.

FIELD

A scanning antenna that reacts to a fast dynamic motion of a platform using electronic scanning along with mechanical steering of at least two axes of motion. Exemplary platforms subject to fast dynamic motion include ships affected by waves, planes affected by air currents and/or fast maneuvers, high altitude platforms or the like. Exemplary uses include maritime antennae communicating with satellite systems.

BACKGROUND

FIG. 1 illustrates dynamics of linear and angular motion of a platform as it reacts to a wave action or the like.

In addition to tracking the direction between a platform's (such as, a ship) movement and heading (attitude) with respect to a satellite, maritime satellite antennas may have to react to the fast back-and-forth dynamic motion of the platform itself. The fast back-and-forth dynamic motion caused by waves. The back-and-forth motion results in 3-dimensional angular movement: roll, pitch, and yaw of platform 100. Antenna design for communicating with Non-Geo Synchronous platforms including Non-Geo Synchronous Orbit (NGSO) satellites such as Low Earth Orbit (LEO) and Medium Earth Orbit (MEO) satellites generates additional challenges. For NGSO satellite networks, the satellite moves with respect to the maritime antenna and the maritime antenna must track the satellite motion to close the link.

In the prior art, a mechanical antenna steering having two axes can theoretically cover any point in the sky. However, in practice, when the satellite is directly above (zenith), an azimuth motor has to run very fast (nearly infinitely fast) for minor changes/movements in pitch. Mechanical steering for satellite antennas on mobile platforms, in particular, Maritime satellite antennas, use a $3^{rd}$ mechanical axis to overcome this difficulty.

In the prior art, a pure phase-array solution uses a 2-dimensional array to orient an antenna. Compared to using an n element linear array of the present teachings, a 2-dimensional array solution requires around $n^2$ or greater elements, where n is the number of elements required for the linear array to achieve the same antenna aperture in the hybrid antenna. A pure phase array antenna suffers tremendous loss at a large scanning angle. To achieve high gain, the 2-dimensional array requires a very large number of elements, which becomes very expensive.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

The present teachings disclose a hybrid scanning antenna that combines the best features of a pure mechanical scanning antenna and an electronic scanning antenna for mobile platforms, such as, maritime, aeronautical, and land-based mobile platforms. The hybrid scanning antenna can be much less expensive than either approach for millimeter wave frequency bands. The hybrid scanning antenna can be more reliable than a pure mechanical scanning antenna, as the fast reaction to motions such as wave actions can be compensated by electronic scanning rather than mechanical movement. The hybrid antenna can be more affordable than a pure 2 or 3-dimensional electronic phase array.

A hybrid scanning antenna including: a reflector having a focal line; a first mechanical movement to move the reflector about a first axis; a second mechanical movement to move the reflector about a second axis; a linear array fixedly disposed along the focal line to electronically scan at a scan angle about a third axis; and a controller to control the first mechanical movement, the second mechanical movement and the scan angle of the linear array to orient the hybrid scanning antenna to a look angle of a remote transceiver.

The hybrid scanning antenna where the controller receives an attitude of the hybrid scanning antenna, computes the look angle based on the attitude, and applies the first mechanical movement, the second mechanical movement and the scan angle of the linear array to orient the hybrid scanning antenna to the look angle.

The hybrid scanning antenna where the controller receives an ephemeris of the remote transceiver and computes the look angle based on the ephemeris.

The hybrid scanning antenna where the controller performs a wide scan over a large sector of the sky for an initial pointing based on a satellite signal strength and the controller applies the first mechanical movement and the second mechanical movement to continuously track the satellite signal strength.

The hybrid scanning antenna where the first mechanical movement includes an electric motor and an arm.

The hybrid scanning antenna where the first mechanical movement includes an electric motor and an arcuate arm.

The hybrid scanning antenna where the second mechanical movement includes an electric motor and an arm.

The hybrid scanning antenna including a turntable, where the first mechanical movement, the second mechanical movement, the reflector and the linear array are disposed on the turntable.

The hybrid scanning antenna including an accelerometer to determine a general direction of a fast motion of the hybrid scanning antenna, where the controller orients the reflector to align the linear array with the general direction of the fast motion.

The hybrid scanning antenna where the linear array includes an Rx linear array layer overlapping a Tx linear array and separated by a sub-reflector layer transparent to Tx signals.

The hybrid scanning antenna where the linear array includes an Rx linear array disposed alongside two Tx linear arrays without overlap.

The hybrid scanning antenna where the reflector has a cylindrical shape in a first dimension while maintaining a parabolic shape in a second dimension.

The hybrid scanning antenna where the hybrid scanning antenna is deployed on a maritime platform affected by waves.

The hybrid scanning antenna where the remote transceiver includes a satellite using radio frequencies.

The hybrid scanning antenna where the remote transceiver includes a line-of-sight transceiver.

A hybrid scanning antenna including: a reflector having a focal line and a cylindrical shape in a first dimension while maintaining a parabolic shape in a second dimension; a first mechanical movement to move the reflector about a first axis; a second mechanical movement to move the reflector about a second axis; a linear array fixedly disposed along the focal line to electronically scan at a scan angle about a third axis; and a controller to control the first mechanical movement, the second mechanical movement and the scan angle of the linear array to orient the hybrid scanning antenna to a look angle of a remote transceiver. The hybrid scanning antenna where the controller receives an attitude of the hybrid scanning antenna, computes the look angle based on the attitude, and applies the first mechanical movement, the second mechanical movement and the scan angle of the linear array to orient the hybrid scanning antenna to the look angle, the controller receives an ephemeris of the remote transceiver and computes the look angle based on the ephemeris, and the remote transceiver includes a satellite using radio frequencies.

The hybrid scanning antenna where the first mechanical movement includes an electric motor and an arm, and the second mechanical movement includes an electric motor and an arm.

Additional features will be set forth in the description that follows, and in part will be apparent from the description, or may be learned by practice of what is described.

DRAWINGS

In order to describe the manner in which the above-recited and other advantages and features may be obtained, a more particular description is provided below and will be rendered by reference to specific embodiments thereof which are illustrated in the appended drawings. Understanding that these drawings depict only typical embodiments and are not, therefore, to be limiting of its scope, implementations will be described and explained with additional specificity and detail with the accompanying drawings.

FIG. 1 illustrates dynamics of linear and angular motion of a platform as it reacts to a wave action or the like.

Figure 1:
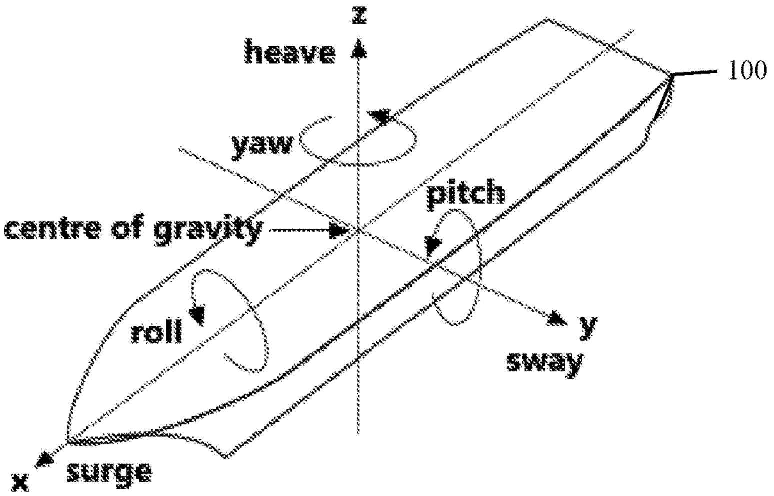

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Embodiments are discussed in detail below. While specific implementations are discussed, this is done for illustration purposes only. A person skilled in the relevant art will recognize that other components and configurations may be used without parting from the spirit and scope of the subject matter of this disclosure.

The terminology used herein is for describing embodiments only and is not intended to be limiting of the present disclosure. As used herein, the singular forms "a," "an" and "the" are intended to include the plural forms as well, unless the context clearly indicates otherwise. Furthermore, the use of the terms "a," "an," etc. does not denote a limitation of quantity but rather denotes the presence of at least one of the referenced items. The use of the terms "first," "second," and the like does not imply any order, but they are included to either identify individual elements or to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. Although some features may be described with respect to individual exemplary embodiments, aspects need not be limited thereto such that features from one or more exemplary embodiments may be combinable with other features from one or more exemplary embodiments.

The present teachings disclose a hybrid steerable antenna including a linear-phase array to add a scanning axis via electronics, rather than using a mechanical motion (for example, with a motor). The electronic scanning axis supplements mechanical steering with an additional axis for scanning. For example, the electronic scanning axis provides a third axis of motion when the mechanical steering provides two-axes of motion. The electronic scanning/steering can react to the dynamic motion of a mobile platform much faster than mechanical steering. The mechanical steering may be used to point the antenna in the general direction of the satellite, while the electronic scanning covers a limited portion of the sky. This significantly reduces the wear and tear of the mechanical steering as it only has to account for slower, more consistent platform motion.

In some embodiments, the mechanical steering may provide three axes of motion, for example, to line up the linear array with a fast motion of the antenna, and the electronic scanning axis provides a fourth axis of motion. This may provide a more effective gain from the linear array by providing a larger scan angle for the linear array, for example, of 30 degrees or greater.

In some embodiments, while the linear array compensates all the perceived up-and-down motion, a small residual perceived motion perpendicular to the linear array may be corrected by the mechanical steering. The choice of the arrangement may depend on the relative weight and SWAPT (size, weight, power, and time) volume requirements.

Electronic steering for the 3rd axis of antenna to orient an antenna is faster than a pure mechanical 3-axis antenna. The electronic steering may be implemented by a linear phase array. The linear array may be disposed in an in-line, for example, in an up-and-down direction caused by waves or the like. As such, rapid turning of a mechanical motor to orient the antenna in the azimuth direction may be avoided. Furthermore, the electronic array alleviates a need to wrap and unwrap any cables connecting to the antenna when an azimuth motor has turned more than 360 degrees in the same direction.

For Ka-band satellites, a practical 2-dimensional array antenna requires many thousands of elements as compared to a linear array needing only tens of elements for. Furthermore, with the mechanical axis pointing to the nominal direction, the linear array requires only a relatively small scanning angle, it suffers negligible scan loss compared to a pure phase array solution. Scan loss is equal to cos(θ), where θ is the angle between the incident wave front and the surface of the array.

The hybrid antenna combines the best features of pure mechanical scanning antenna and electronic scanning antenna for applications where an antenna platform is in motion, for example, a maritime platform. It can be much less expensive than either approach for millimeter wave frequency bands. It is also much more reliable than a pure mechanical scanning antenna, as the fast reaction to the wave action can be compensated by electronic scanning.

The antenna platform may be motion. The roll and pitch motion of the platform may dominate elevation angle changes, while the yaw motion affects azimuth angle changes. Exemplary motion of the platform may be as such:

| | Range | Velocity | Acceleration |
|---|---|---|---|
| Roll | ±20° | 8°/sec | 5°/sec$^2$ |
| Pitch | ±10° | 6°/sec | 5°/sec$^2$ |
| Yaw | ±8° | 15°/sec | 5°/sec$^2$ |

Figure 2A:
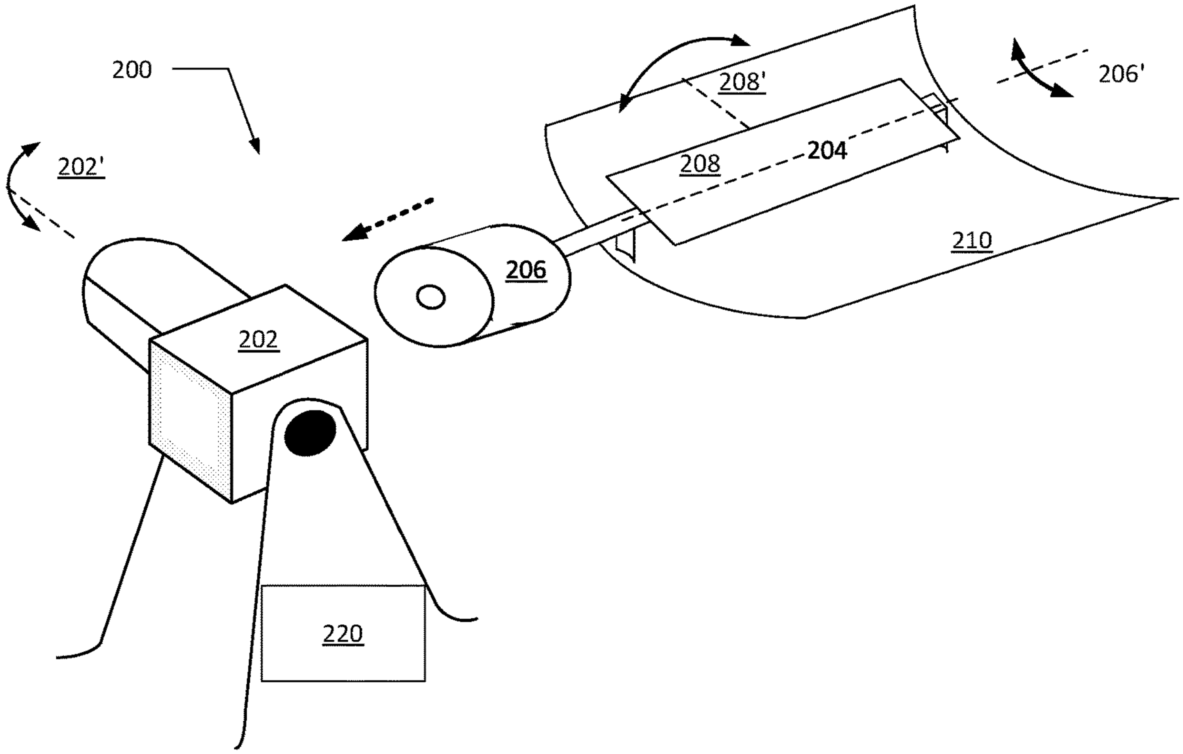
FIG. 2A illustrates a hybrid scanning antenna for 3-dimensions including a mechanical platform and a linear array, according to various embodiments.

FIG. 2A illustrates a hybrid scanning antenna for 3-dimensions including a mechanical platform and a linear array, according to various embodiments.

A hybrid scanning antenna 200 may include a reflector 210 having a focal line 204. The reflector 210 may have a cylindrical shape in one dimension while maintaining a parabolic shape in the other dimension. The hybrid scanning antenna 200 may include a first mechanical movement 202 to move the reflector 210 along a first axis 202'. The hybrid scanning antenna 200 may include a second mechanical movement 206 to move the reflector 210 along a second axis 206'. The hybrid scanning antenna 200 may include a linear array 208 to electronically scan along a third axis 208'.

The hybrid scanning antenna 200 may include a controller 220 to orient the hybrid scanning antenna 200 mechanically and electronically to a look angle (not shown) of a transceiver disposed in a remote platform (not shown), for example, a satellite, a high-altitude platform, an airplane, a ship, or the like. The controller 220 may control the first mechanical movement 202 to orient the hybrid scanning antenna 200 along the first axis 202'. For example, a first axis 202' motion may change an elevation angle of the reflector 210. The controller 220 may control the second mechanical movement 206 to orient the hybrid scanning antenna 200 along the second axis 206'. For example, a second axis 206' motion may change an azimuth angle of the reflector 210. The controller 220 may change weights used for signals to/from the linear array 208 to orient the hybrid scanning antenna 200 along the third axis 208'.

The first and seconds mechanical movements may include one or more of a motor, an arm, gears, cam, or the like. An exemplary range of motion for the first mechanical movement 202 may be +/−45 degrees. An exemplary range of motion for the second mechanical movement 206 may be +/−100 degrees.

In some embodiments, the controller 220 may use an off-the-shelf product to compute a look angle to orient the hybrid scanning antenna 200 to a remote transceiver. The controller 220 may receive ephemeris data for the remote transceiver and an attitude of the platform to compute azimuth, elevation and scan angles needed. The ephemeris data may be changing when the remote transceiver is in motion with respect to the hybrid scanning antenna 200. The attitude may include a roll, pitch, yaw, heave, surge, and sway of the hybrid scanning antenna 200. The ephemeris may include polar coordinates of the remote platform with the earth's center at the center of the box. The look angle may include an azimuth angle, an elevation angle, and a scan angle from the earth's surface.

While use of satellite ephemeris information along with the vessel's own location may be used to determine how to point its antenna to the satellite initially, it is possible to perform a wide scan over a large sector of the sky to determine an initial pointing direction for the antenna. In some embodiments, the initial pointing may be performed while the vessel is in relative calm water. Once the initial pointing is accomplished, continuously tracking the satellite signal strength may keep the antenna pointed towards the satellite.

Figure 2B:
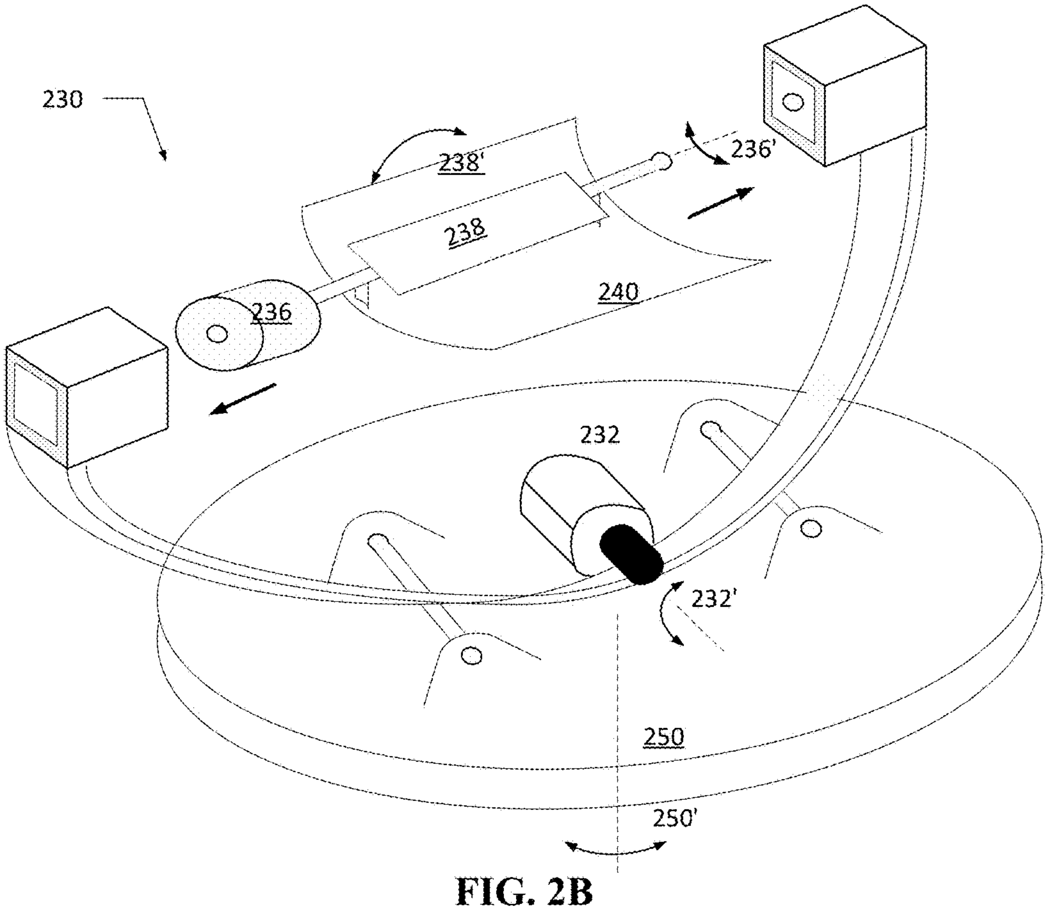
FIG. 2B illustrates a hybrid scanning antenna for 3-dimensions including a mechanical platform and a linear array, according to various embodiments.

FIG. 2B illustrates a hybrid scanning antenna for 3-dimensions including a mechanical platform and a linear array, according to various embodiments.

A hybrid scanning antenna 230 may include a reflector 240 having a focal line (not shown). The reflector 240 may have a cylindrical shape in one dimension while maintaining a parabolic shape in the other dimension. The hybrid scanning antenna 230 may include a first mechanical movement 232 to move the reflector 210 along a first axis 232'. The hybrid scanning antenna 230 may include a second mechanical movement 236 to move the reflector 240 along a second axis 236'. The hybrid scanning antenna 20 may include a linear array 238 to electronically scan along a third axis 238'. The hybrid scanning antenna 230 may include a controller (not shown) to orient the hybrid scanning antenna 230 mechanically and electronically to a look angle (not shown) of a transceiver disposed in a remote platform (not shown), for example, a satellite, a high-altitude platform, an airplane, a ship, or the like as discussed above.

The first mechanical movement 232 may include one or more of a motor, an arcuate arm, a half-circle arc, gears, a cam, or the like. An exemplary range of motion for the first mechanical movement 232 along the first axis 232' may be +/−80 degrees. The second mechanical movement 236 may include one or more of a motor, an arm, gears, cam, or the like. An exemplary range of motion for the second mechanical movement 236 along the second axis 236' may be +/−100 degrees.

The linear array 238 to react to the fastest motion dynamics of the vessel's motion. For a typical ship, a roll is more dominant than pitch since a length of a ship is much greater than its width. A yaw may also be faster than pitch, as a wave does not hit the stern and bow of the ship at the same time. A sensor (not shown) may be added to the hybrid scanning antenna to determines a general direction of a faster motion of the vessel. A third mechanical movement 250 along a third axis 250' may turn the cylindrical reflector 240 such that the linear array 238 is in line with the direction of fast motion. The sensor can be an accelerometer as commonly used by smart electronics devices. The sensor may help determine the vessel's heading to facilitate an initial pointing of the antenna. The third mechanical movement 250 may be a turntable rotated by a motor (not shown) having a range of +/−180 degrees along the third axis 250'.

Figure 3A:
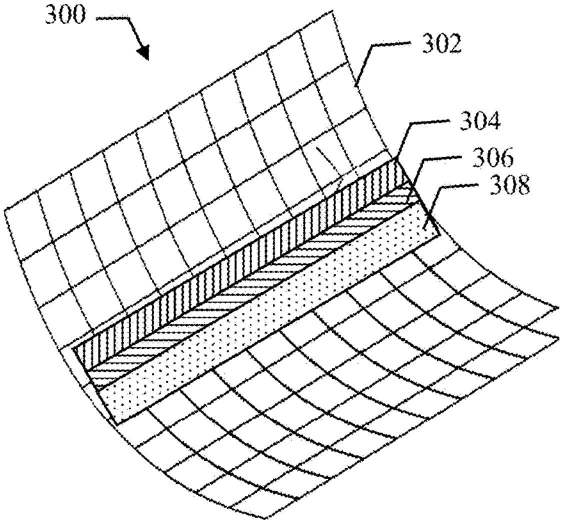
FIG. 3A illustrates a hybrid scanning antenna, according to various embodiments.
Figure 3B:
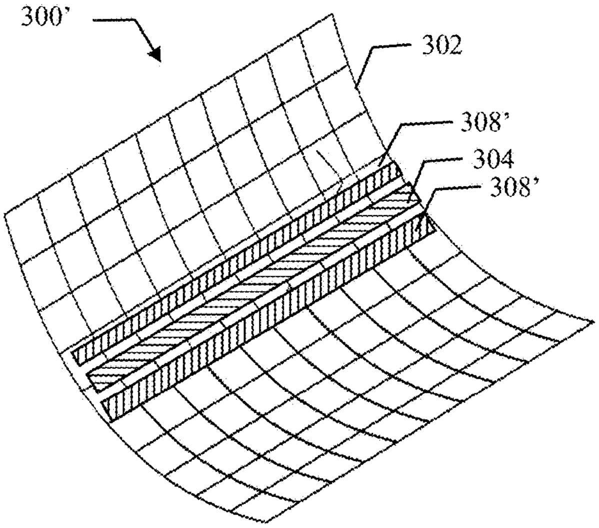
FIG. 3B illustrates a hybrid scanning antenna, according to various embodiments.

The mounting and steering mechanism of FIG. 3B may distribute the weight of the antenna more evenly and may be stable mechanically on the choppy water. The elevation orientation may be provided by the first mechanical movement 232. The linear array orientation may be provided by the second mechanical movement 236. The third mechanical movement 250 (illustrated as a turntable) may be mounted on the vessel. The turntable may rotate +/−180 degree to point the antenna in the azimuth direction. The half-circle arc of the first mechanical movement 232 may sit on two rollers that allows the array and reflector assembly to lineup with the orientation of the linear array with the direction of fast motion slightly under +/−90 deg The ends of the arc can be rotated to point the antenna to a nominal elevation angle +/−45 deg or more, up to +/−100 degree. (Greater than 45 degrees may reduce the rotation of turntable when called for otherwise.)

FIG. 3A illustrates a hybrid scanning antenna according to various embodiments.

A hybrid scanning antenna 300 may include a reflector 302 and a linear-phase array including an Rx linear array layer 304, a Tx linear array layer 308 and a sub-reflector layer 306. The sub-reflector layer 306 reflects Rx signals and allows transmission of (transparent to) Tx signals. The sub-reflector layer 306 may be a Fixed Satellite Service (FSS) reflector. The Rx linear array layer 304, the Tx linear array layer 308 and the sub-reflector layer 306 may be disposed on a substrate, for example, a unibody substrate. The Rx linear array layer 304, the Tx linear array layer 308 and the sub-reflector layer 306 may be disposed so as to overlap one another with the sub-reflector layer 306 between the Rx linear array layer 304 and the Tx linear array layer 308.

FIG. 3B illustrates a hybrid scanning antenna according to various embodiments.

A hybrid scanning antenna 300' may include a reflector 302 and a linear-phase array including an Rx linear array 304 and two Tx linear arrays 308' disposed parallel to Rx linear arrays. The two Tx linear arrays 308' can have a common focal line with the Rx linear array 304. The Rx linear array 304 and the two Tx linear arrays 308' may be disposed on a substrate, for example, a unibody substrate. The Rx linear array 304 and the two Tx linear arrays 308' may be disposed parallel to one another without overlap.

Linear array arrangements other than the arrangements illustrated in FIG. 3A and FIG. 3B may be used.

Although the subject matter has been described in language specific to structural features and/or methodological acts, it is to be understood that the subject matter in the appended claims is not necessarily limited to the specific features or acts described above. Rather, the specific features and acts described above are disclosed as example forms of implementing the claims. Other configurations of the described embodiments are part of the scope of this disclosure. Further, implementations consistent with the subject matter of this disclosure may have more or fewer acts than as described or may implement acts in a different order than as shown. Accordingly, the appended claims and their legal equivalents should only define the invention, rather than any specific examples given.

We claim as our invention:

1. A hybrid scanning antenna comprising:

a reflector having a focal line;

a first mechanical movement to move the reflector about a first axis;

a second mechanical movement to move the reflector about a second axis;

a linear array fixedly disposed along the focal line to electronically scan at a scan angle about a third axis; and a controller to control the first mechanical movement, the second mechanical movement and the scan angle of the linear array to orient the hybrid scanning antenna to a look angle of a remote transceiver, wherein the linear array comprises an Rx linear array layer overlapping a Tx linear array and separated by a sub-reflector layer transparent to Tx signals.

2. A hybrid scanning antenna comprising:

a reflector having a focal line;

a first mechanical movement to move the reflector about a first axis;

a second mechanical movement to move the reflector about a second axis;

a linear array fixedly disposed along the focal line to electronically scan at a scan angle about a third axis; and a controller to control the first mechanical movement, the second mechanical movement and the scan angle of the linear array to orient the hybrid scanning antenna to a look angle of a remote transceiver, wherein the linear array comprises an Rx linear array disposed alongside two Tx linear arrays without overlap.

3. The hybrid scanning antenna of claim 2, wherein the controller receives an attitude of the hybrid scanning antenna, computes the look angle based on the attitude, and applies the first mechanical movement, the second mechanical movement and the scan angle of the Rx linear array to orient the hybrid scanning antenna to the look angle.

4. The hybrid scanning antenna of claim 2, wherein the controller receives an ephemeris of the remote transceiver and computes the look angle based on the ephemeris.

5. The hybrid scanning antenna of claim 2, wherein the controller receives an ephemeris of the remote transceiver and computes the look angle based on the ephemeris.

6. The hybrid scanning antenna of claim 2, wherein the first mechanical movement comprises an electric motor and an arm.

7. The hybrid scanning antenna of claim 2, wherein the first mechanical movement comprises an electric motor and an arcuate arm.

8. The hybrid scanning antenna of claim 2, wherein the second mechanical movement comprises an electric motor and an arm.

9. The hybrid scanning antenna of claim 2, further comprising a turntable, wherein the first mechanical movement, the second mechanical movement, the reflector and the Rx linear array are disposed on the turntable.

10. The hybrid scanning antenna of claim 2, further comprising an accelerometer to determine a general direction of a fast motion of the hybrid scanning antenna, wherein the controller orients the reflector to align the Rx linear array with the general direction of the fast motion.

11. The hybrid scanning antenna of claim 2, wherein the reflector has a cylindrical shape in a first dimension while maintaining a parabolic shape in a second dimension.

12. The hybrid scanning antenna of claim 2, wherein the remote transceiver comprises a satellite using radio frequencies.

13. A hybrid scanning antenna comprising:

a reflector having a focal line and a cylindrical shape in a first dimension while maintaining a parabolic shape in a second dimension;

a first mechanical movement to move the reflector about a first axis;

a second mechanical movement to move the reflector about a second axis;

a linear array fixedly disposed along the focal line to electronically scan at a scan angle about a third axis;

a controller to control the first mechanical movement, the second mechanical movement and the scan angle of the linear array to orient the hybrid scanning antenna to a look angle of a remote transceiver; and a turntable, wherein the first mechanical movement comprises an arcuate arm, and the first mechanical movement, the second mechanical movement, the reflector and the linear array are disposed on the turntable, wherein the controller receives an attitude of the hybrid scanning antenna, computes the look angle based on the attitude, and applies the first mechanical movement, the second mechanical movement and the scan angle of the linear array to orient the hybrid scanning antenna to the look angle, the controller receives an ephemeris of the remote transceiver and computes the look angle based on the ephemeris, and the remote transceiver comprises a satellite using radio frequencies.

14. The hybrid scanning antenna of claim 13, wherein the controller performs a wide scan over a large sector of the sky for an initial pointing based on a satellite signal strength and the controller applies the first mechanical movement and the second mechanical movement to continuously track the satellite signal strength.

15. The hybrid scanning antenna of claim 13, wherein the hybrid scanning antenna is deployed on a maritime platform affected by waves.

16. The hybrid scanning antenna of claim 13, wherein the remote transceiver comprises a line-of-sight transceiver.

17. The hybrid scanning antenna of claim 13, wherein the first mechanical movement comprises an electric motor and an arm, and the second mechanical movement comprises an electric motor and an arm.

18. The hybrid scanning antenna of claim 13, further comprising an accelerometer to determine a general direction of a fast motion of the hybrid scanning antenna, wherein the controller orients the reflector to align the linear array with the general direction of the fast motion.

* * * * *